(12) United States Patent
Chin

(10) Patent No.: US 8,433,337 B2
(45) Date of Patent: Apr. 30, 2013

(54) RSS-BASED DOA INDOOR LOCATION ESTIMATION SYSTEM AND METHOD

(76) Inventor: Ting-Yueh Chin, Taichung (TW)

( * ) Notice: Subject to any disclaimer, the term of this patent is extended or adjusted under 35 U.S.C. 154(b) by 79 days.

(21) Appl. No.: 13/185,455

(22) Filed: Jul. 18, 2011

(65) Prior Publication Data

US 2013/0023278 A1    Jan. 24, 2013

(51) Int. Cl.
*H04W 24/00* (2009.01)

(52) U.S. Cl.
USPC ............ 455/456.1; 455/456.2; 455/456.3; 455/456.6; 455/457; 701/469; 701/470

(58) Field of Classification Search ........... 455/456.1, 455/456.2, 456.3, 456.4, 456.5, 456.6, 457; 701/468, 469, 470
See application file for complete search history.

(56) References Cited

U.S. PATENT DOCUMENTS

| | | | |
|---|---|---|---|
| 7,233,799 B2 * | 6/2007 | Spain, Jr. | 455/456.1 |
| 7,715,849 B2 * | 5/2010 | Spirito et al. | 455/456.1 |
| 7,751,829 B2 * | 7/2010 | Masuoka et al. | 455/456.1 |
| 7,990,314 B2 * | 8/2011 | Liao | 342/357.29 |

* cited by examiner

*Primary Examiner* — Anthony Addy
*Assistant Examiner* — Amanuel Lebassi
(74) *Attorney, Agent, or Firm* — Ding Yu Tan

(57) ABSTRACT

Method for received signal strength-based direction-of-arrival location estimation for wireless target in an indoor environment is disclosed. The method can use just one DOA sensor node with three antennas, configured substantially in the center of a predetermined confined indoor space. Packet signals can be transmitted by DOA sensor node to the wireless target, and vice versa, where each packet comprising of a fixed sensor node cover range. RSSI values are obtained for the respective RSSI states received from the wireless target at incident angles $\phi$ using the triangular antenna array, a 1P2T switch, and a vector signal deconstructor (VSD). A location $(\theta, \phi)$ of the localized object is calculated using a RSS-based DOA algorithm. A RSS to DOA localization system using the above method is also disclosed.

21 Claims, 13 Drawing Sheets

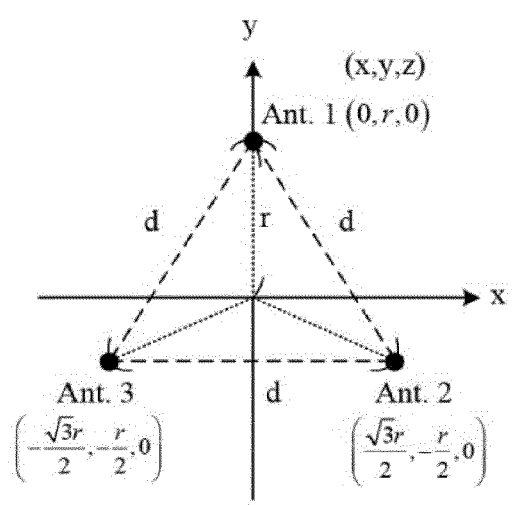 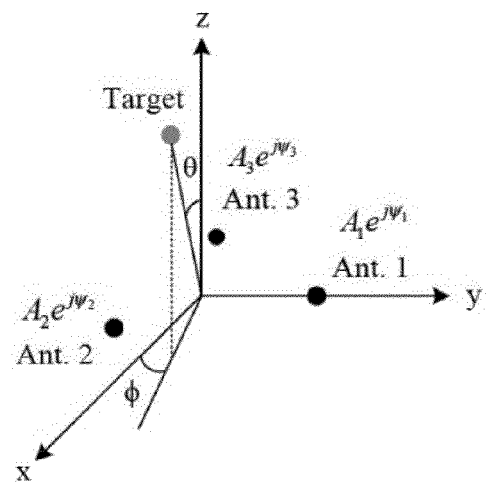
FIG. 8  FIG. 9

RSS-BASED DOA INDOOR LOCATION
ESTIMATION SYSTEM AND METHOD

TECHNICAL FIELD

The embodiments of the present application relates generally to indoor location estimation system and method, and more particularly, to a received signal strength (RSS)-based direction-of-arrival (DOA) location estimation system and method for indoor applications.

BACKGROUND OF THE INVENTION

Positioning or location estimation systems are often used both indoor and outdoor in our daily lives. Location information is considered to add value or enable many new potential consumer and business applications to telecommunications, such as fraud protection, location-aware network access, person/asset tracking, etc. Future new applications for indoor RF positioning systems may be growing, and may include applications and usages in department stores, parking lots, malls, amusement parks, libraries, and schools. There are a number of common conventional techniques for determining the position of an electronic device using radio frequency signals. Some popular techniques are directed to the use of the Global Positioning System (GPS), in which multiple satellites orbiting Earth transmit radio frequency signals that enable a GPS receiver to determine its exact position.

However, GPS is often not very effective in determining an accurate positioning or location estimation for GPS receiver located indoors. Depending on operating conditions, a signal diffraction or reflection often occurs due to buildings causing an error in distance measurement using the GPS signal, which leads to deterioration in accuracy of position determination. On the other hand, the GPS signal is very weak in the indoor environment because of the building blocking; the GPS receiver cannot collect enough information from GPS satellites. Therefore, the positioning finding using GPS technology in the indoor environment is almost impossible.

In an attempt to resolve the mentioned problem, some non-GPS positioning techniques have been developed for enabling electronic devices to determine its position indoors. These techniques for location sensing, include triangulation, proximity, and scene analysis. Each conventional technique has its advantages and disadvantages. Some of these techniques do not result in accurate positioning or location estimate being determined, and others are too complex for use or too expensive to integrate for typical commercial applications. These positioning techniques adopted for indoor RF positioning includes for example, RFID (proximity), UWB (triangulation), WiFi RSS mapping (scene analysis).

There are general two types of triangulation positioning or location estimating methods/algorithms. One is called Direction finding (DF). Direction finding (DF) systems utilize antenna arrays and Angle-of-Arrival (AoA)/Direction of Arrival (DOA) estimation in order to localize a mobile station (MS). Another is called range-estimation. Range-based (RB) systems for range-estimation estimate the distance between the MS and a number of Base Stations (BSs), and then the MS's position is calculated by the intersection point of the corresponding circles. Range estimation may be based on either the Time-of-Arrival (ToA) or the Received Signal Strength (RSS) of the incoming RF signal. Both DF and RB systems suffer from inherent propagation channel characteristics, therefore, inaccuracies on the position locating always occur regardless of the underlying localization algorithm.

When using the received signal strength (RSS) systems for the range estimation, although they can be used for general-purpose applications and has lower cost, but they have poor accuracy of up to about 3 to 5 meters due to multipath effect in an indoor environment. Another improved method is to use RSS map or RSS fingerprinting to obtain better positioning accuracy, but nevertheless, it still only have accuracy of up to 2 to 3 meters and carries higher cost due to requiring in-situ measurements. Meanwhile, when using time difference or phased array DOA systems, the respective indoor positioning usage can be adapted to be more specific, such as for military requirements, however, but it is quite expensive and bulky and thereby not suitable for common commercial usage due to requiring antenna arrays and synchronization respectively.

BRIEF SUMMARY OF THE INVENTION

According to various embodiments of the invention there is provided a method for providing location estimating or positioning of one or more wireless electronic devices in an indoor environment having lower cost and higher accuracy.

According to various embodiments of the invention, the method for providing positioning or location estimation of one or more wireless electronic devices in an indoor environment can be adapted to support a plurality of wireless standards without requiring additional equipment or hardware for the wireless electronic device to be positioned.

According to various embodiments of the invention, the method for providing positioning or location estimation of one or more wireless electronic devices in an indoor environment can be achieved having reduced number of access nodes or DOA sensor nodes required.

According to various embodiments of the invention, the method for providing positioning or location estimation of one or more wireless electronic devices in an indoor environment can be implemented via a RSS-based DOA algorithm having RSS as input and DOA as output (RSS to DOA).

According to various embodiments of the invention, the method for providing positioning or location estimation of one or more wireless electronic devices in an indoor environment can be implemented via an N-path vector signal deconstructor (VSD).

According to various embodiments of the invention there is provided an indoor RF positioning system for providing positioning of one or more wireless electronic devices in an indoor environment comprising a triangular antenna array, a wireless access point unit, a 1P2T solid-state RF switch, and an electronic circuit for the vector signal deconstructor (VSD). The DOA sensor is configured for obtaining the values for (θ, φ) respectively.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the housing. Moreover, in the drawings like reference numerals designate corresponding parts throughout the several views. Wherever possible, the same reference numerals are used throughout the drawings to refer to the same or like elements of an embodiment.

FIG. 8 shows the layout and configuration of each of the antennas for the third embodiment.

FIG. 9 shows how $\phi$ and $\theta$ angles are defined with respect to the target and the three antennas in the third embodiment.

DETAILED DESCRIPTION OF THE INVENTION

In the following embodiments and also in current art, Received Signal Strength Indicator (RSSI) is a measurement of power present in a received radio signal, it is implemented in most of wireless standards such as WLAN, Bluetooth, Zigbee . . . etc. RSSI value can be used to determine the amount of radio energy in the channel, and it is often done in the intermediate frequency (IF) stage. RSSI usually has 100 or 127 states (−1 dB resolution).

In the following embodiments, a wireless target can be mobile phone, smart phone, tablet device, digital camera with wireless communication capability, a PDA, a notebook computer, a computer with wireless capability, a USB wireless device, a game controller with wireless capability, an object with a wireless identification tag, etc. . . . . In the following embodiments, a localized object is any object that is in close proximity or directly contacting the wireless target, which is desired to obtain the precise and accurate location thereof, i.e. a person (the localized object) carrying a mobile phone (wireless target) in his pants pocket.

Figure 1:
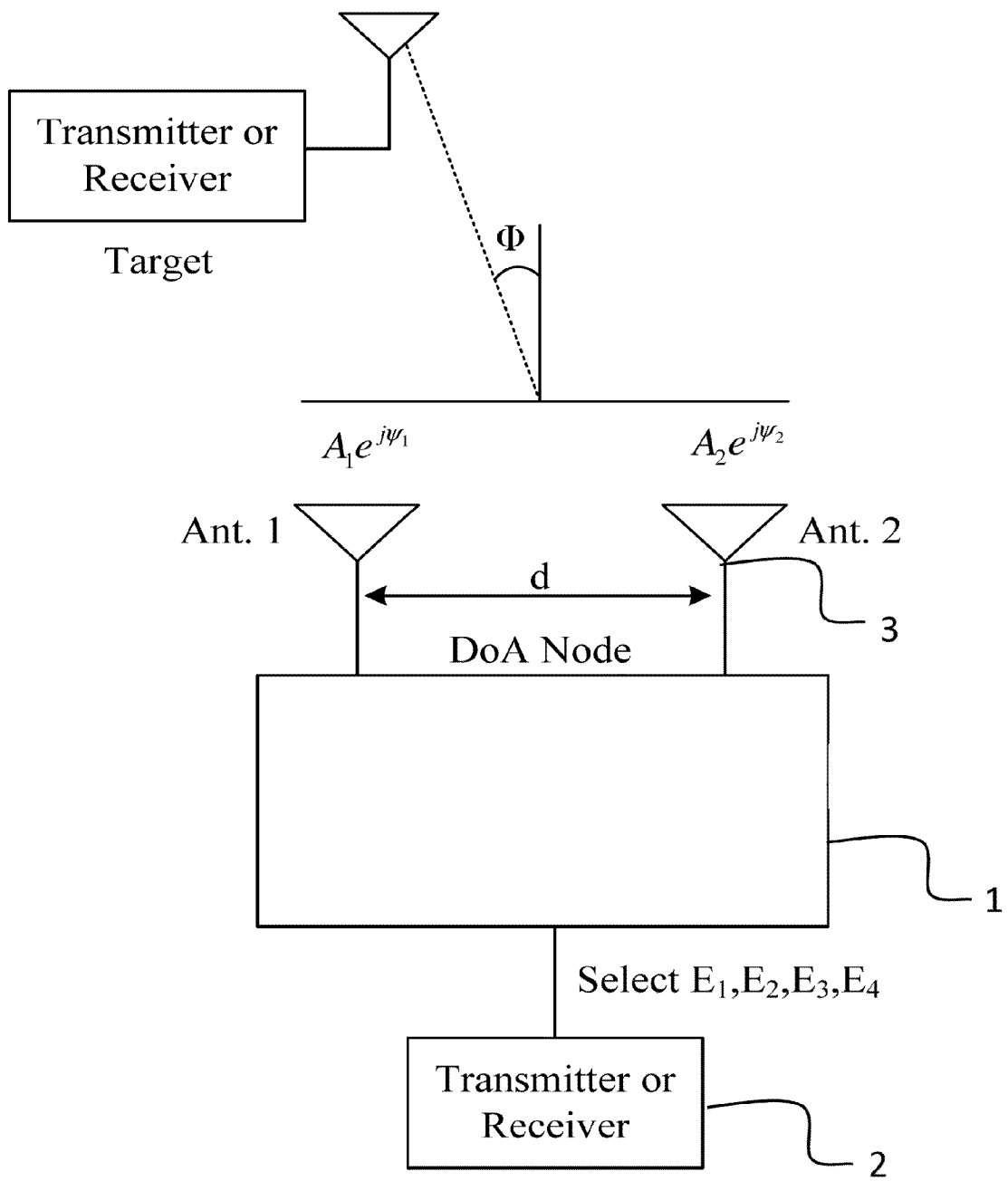
FIG. 1 shows a RSS to DOA localization system adopting a method of a first embodiment.

According to a first embodiment of the present invention, a method for providing location estimation of wireless electronic devices in an indoor environment implemented via a RSS-based DOA algorithm is provided. Only Received Signal Strength for received signal is required to calculate the phase difference ($\psi_{12}$) and signal strength ($A_1$ and $A_2$). Using the derived phase difference ($\psi_{12}$), the Direction-of-Arrival, DoA of the localized object along with the wireless target can then be derived also. The signal strength can also be used to assess multipath interference conditions. Refer to FIG. 1, which shows the RSS to DOA localization system adopting the method of the first embodiment, in which this indoor location estimation system has two antennas 3, namely, antenna 1 and antenna 2, and one wireless target.

A DOA sensor node is configured from and comprising of the antennas 1 and 2. Upon the DOA sensor node receiving one or more wireless signal from the wireless target, in which the wireless target can function both as a transmitter or receiver 2, the phase difference $\psi_{12}$ is then calculated from the incident angle $\phi$ of the wireless target, by the equation [1] as follows:

$$\psi_{12} = \frac{2\pi d}{\lambda}\sin\Phi \quad [1]$$

In which d is the distance between Antenna 1 and Antenna 2, $\lambda$ is wavelength of the operating frequency. The function block 1 in FIG. 1 is called a vector signal deconstructor (VSD) 100 in the embodiments of instant disclosure. Function block 1 generates four vector-sum states by combining the signals from Antennas 1 and 2, respectively, namely, $$E_1 = \frac{1}{\sqrt{2}}(A_1 e^{j\psi_1} + A_2 e^{j\psi_2}) \quad [2a\sim2d]$$

$$E_2 = \frac{1}{\sqrt{2}}(A_1 e^{j\psi_1} - A_2 e^{j\psi_2})$$

$$E_3 = \frac{1}{\sqrt{2}}(A_1 e^{j\psi_1} + jA_2 e^{j\psi_2})$$

$$E_4 = \frac{1}{\sqrt{2}}(A_1 e^{j\psi_1} - jA_2 e^{j\psi_2})$$

The four vector-sum states can be seen as the vector signal of Antenna 1 adding to the vector signal of Antenna 2 with 0°, 180°, 90°, 270° phase shifting, respectively. The RSSI is not limited to those received from the wireless target by a beam at an incident angle $\phi$ only, but also includes those signals that are received from the DOA sensor node by a beam at an incident angle $\phi$. The flexibility for RSSI signal transmission is referred to herein as having a reciprocal or bidirectional characteristic. For the sake of simplicity, in this embodiment, the DOA sensor node is being selected as the receiver and the localized object by means of the wireless target is selected as the transmitter. Upon the transmission of a signal packet, the DOA sensor node receives the signal strength for the four vector sum-states $|E_1|^2, |E_2|^2, |E_3|^2, |E_4|^2$, which is then used to derive the phase difference between Antennas 1 and 2 by performing the following calculation:

$$\psi_{12} = \mathrm{Tan}^{-1}\left(\frac{|E_3|^2 - |E_4|^2}{|E_1|^2 - |E_2|^2}\right), -\pi \le \psi_{12} \le \pi \quad [3]$$

And then the incident angle $\phi$ of the wireless target/localized object is calculated as follow:

$$\Phi = \frac{\lambda}{2\pi d}\sin^{-1}(\psi_{12}), -\frac{\pi}{2} \le \Phi \le \frac{\pi}{2} \quad [4]$$

Figure 2:
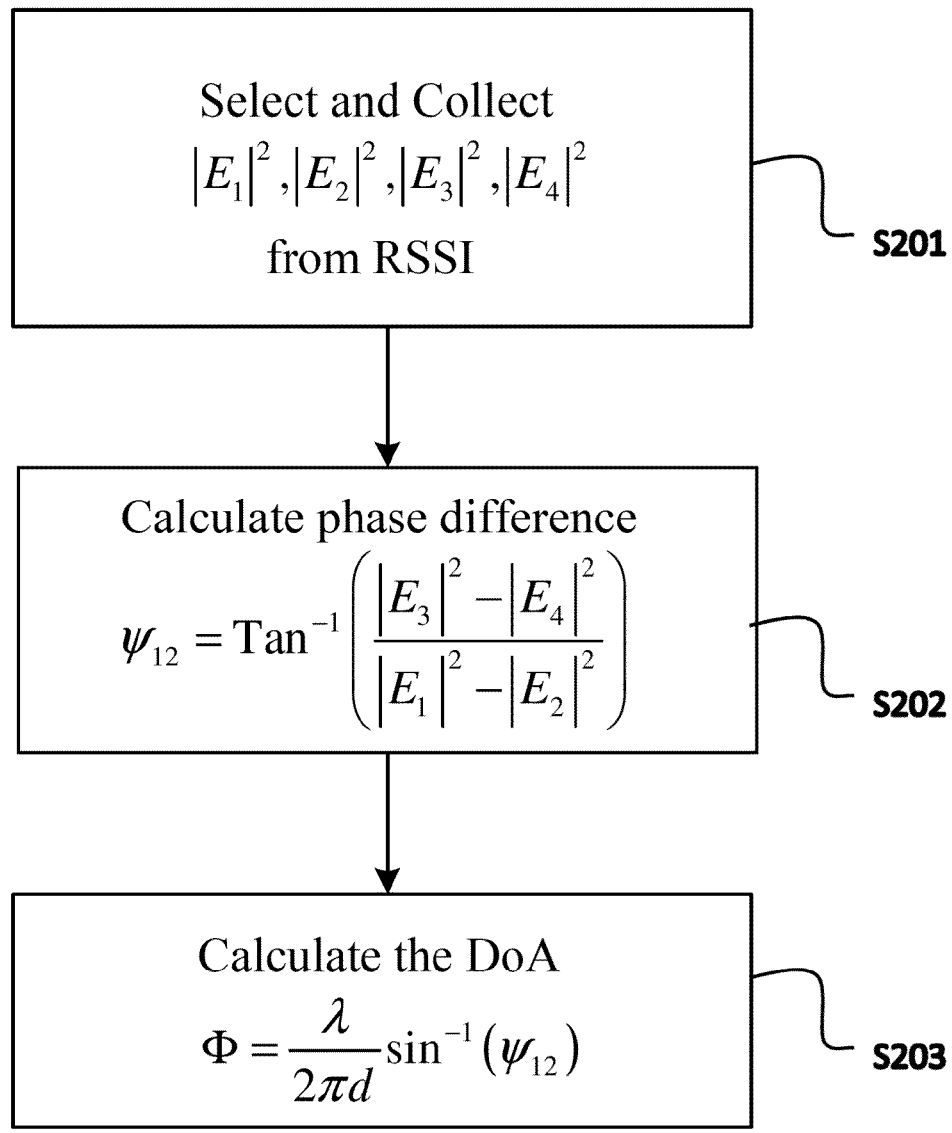
FIG. 2 shows a process diagram for a RSS-based DOA algorithm for the location estimation method in an indoor environment.

A process diagram for a RSS-based DOA algorithm for the location estimation method in an indoor environment is provided in FIG. 2. Only Received Signal Strength for received signal is required and in which the Direction-of-Arrival, DoA of the localized object with the wireless target is later derived. In step S201, $|E_1|^2, |E_2|^2, |E_3|^2, |E_4|^2$ are selected and collected from RSSI values. In step S202, a phase difference is calculated. In step S203, a DOA is calculated. The magnitude of the received signal by the Antennas 1 and 2 can be expressed as follow:

$$A_{1,2} = \frac{1}{2}\sqrt{|E_1|^2 + |E_2|^2 \pm \sqrt{4|E_1|^2|E_2|^2 - (|E_3|^2 - |E_4|^2)^2}} \quad [5]$$

The value of the smaller signal =

$$\frac{1}{2}\sqrt{|E_1|^2 + |E_2|^2 - \sqrt{4|E_1|^2|E_2|^2 - (|E_3|^2 - |E_4|^2)^2}}$$

and value for the larger signal =

$$\frac{1}{2}\sqrt{|E_1|^2 + |E_2|^2 + \sqrt{4|E_1|^2|E_2|^2 - (|E_3|^2 - |E_4|^2)^2}}$$

In this embodiment, only four vector-sum states of Antennas 1 and 2 are needed for calculating the incident angle φ of the wireless target, thus an efficient method requiring less power consumption, and without requiring the usage of any continuous adjustable phase shifting (being more expensive option) is provided. As comparison, for example, other conventional technique using null scanning at angle precision of 1 degree would require a total of 180 times for scanning from 0 degree to 180 degrees. On the other hand, the first embodiment of present invention requires only a total of scanning of 4 times. Moreover, multipath interference can also be evaluated by the VSD algorithm in this embodiment alone, without requiring any extra other additional elements.

Figure 3:
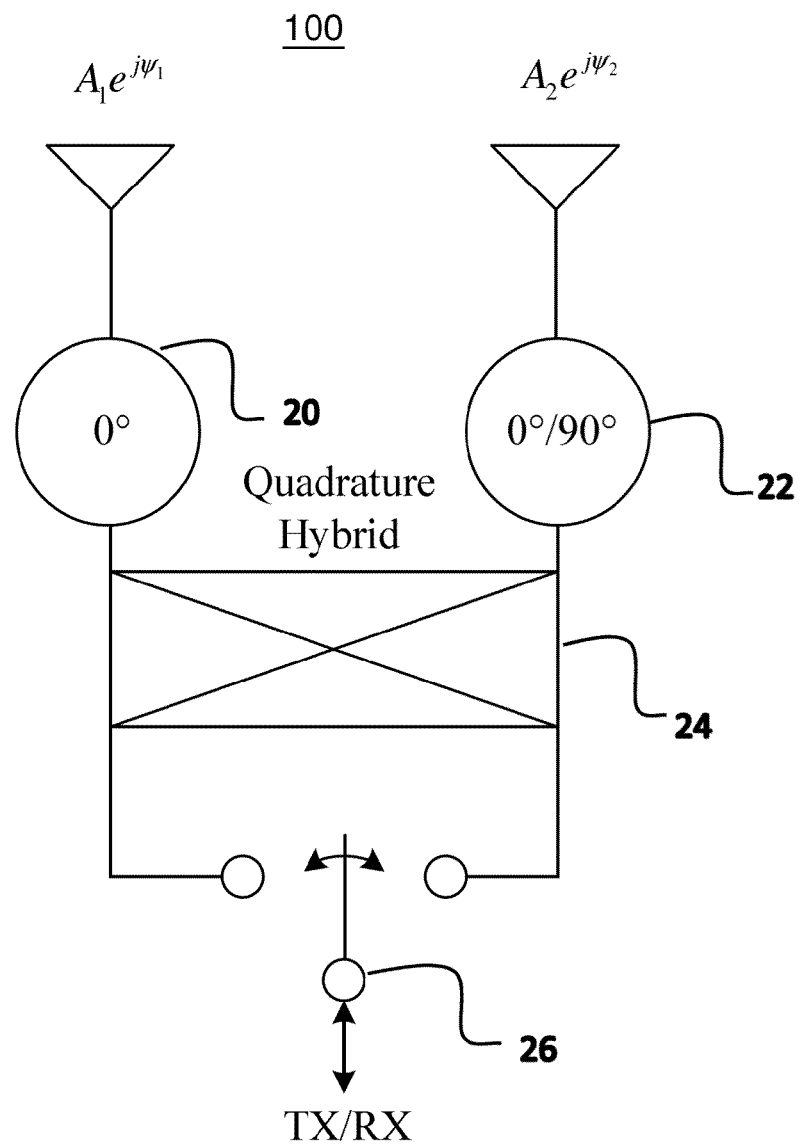
FIG. 3 shows a device configuration for the vector signal deconstructor (VSD) according to the first embodiment is shown below in FIG. 3.
Figure 4:
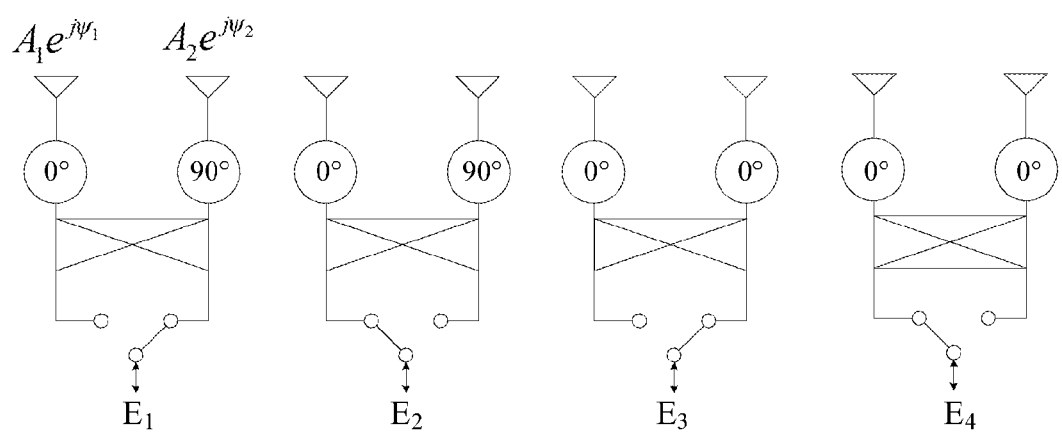
FIG. 4 shows four vector-sum states as obtained via the VSD according to the first embodiment.

The device configuration for the vector signal deconstructor (VSD) 100 according to the first embodiment includes a 0° reference line 20, a 0° 190° switchable phase shifter 22, a quadrature hybrid (3-dB 90° coupler) 24, and a 1P2T absorptive switch 26. In another embodiment, other conventional device/circuit configuration for achieving 0°, 180°, 90°, 270° phase shifting for antenna pairs can also be used. The device configuration for the vector signal deconstructor (VSD) 100 according to the first embodiment is shown below in FIG. 3. The four vector-sum states as obtained via the VSD 100 according to the first embodiment are shown in FIG. 4.

In regards to the flexibility for RSSI signal transmission as having reciprocal or bidirectional characteristic, at least two signal transmission options are available:

Option 1: DoA RX mode (RSSI is at the DOA node); and
Option 2: DoA TX mode (RSSI is at the wireless target).

Option 1 is suitable for use for surveillance and security applications. The Option 2 mode is similar to GPS, and is suitable for use in public environment in which the localized object can decide whether or not to accept the positioning packet requesting for access permission. The benefits for this option are that the design requirements on the wireless targets are less, and that personal privacy are more protected since only the localized object realize or have access to the positioning results.

Figure 5:
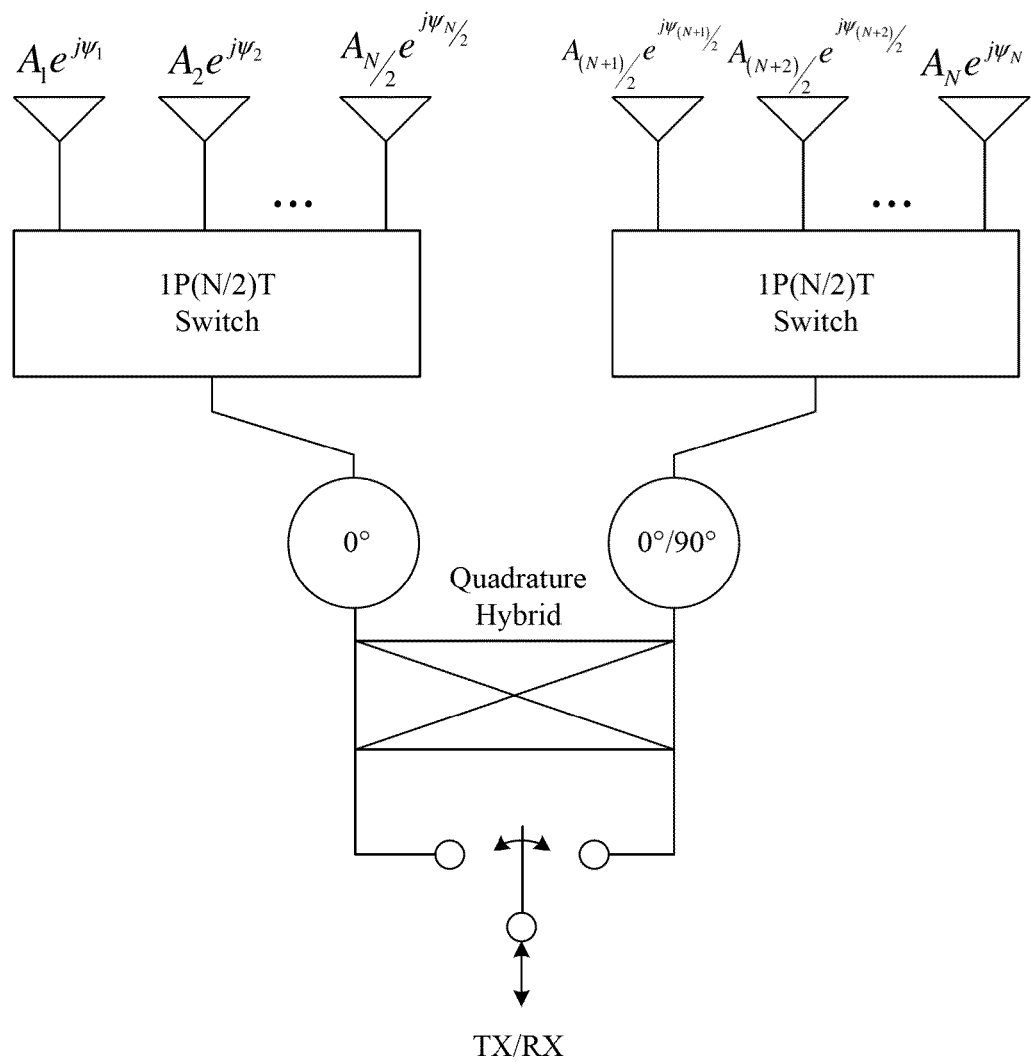
FIG. 5 shows a circuit block of N-path VSD.

Another embodiment for present invention having N-VSD 110 is described below. The circuit block of N-path VSD 110 is shown in FIG. 5, in which N represents the total number of antennas utilized. Therefore, N number of antennas requires a total of 4(N−1) vector-sum states for determining the phase differences and incident angle φ of the antennas.

Figure 6A:
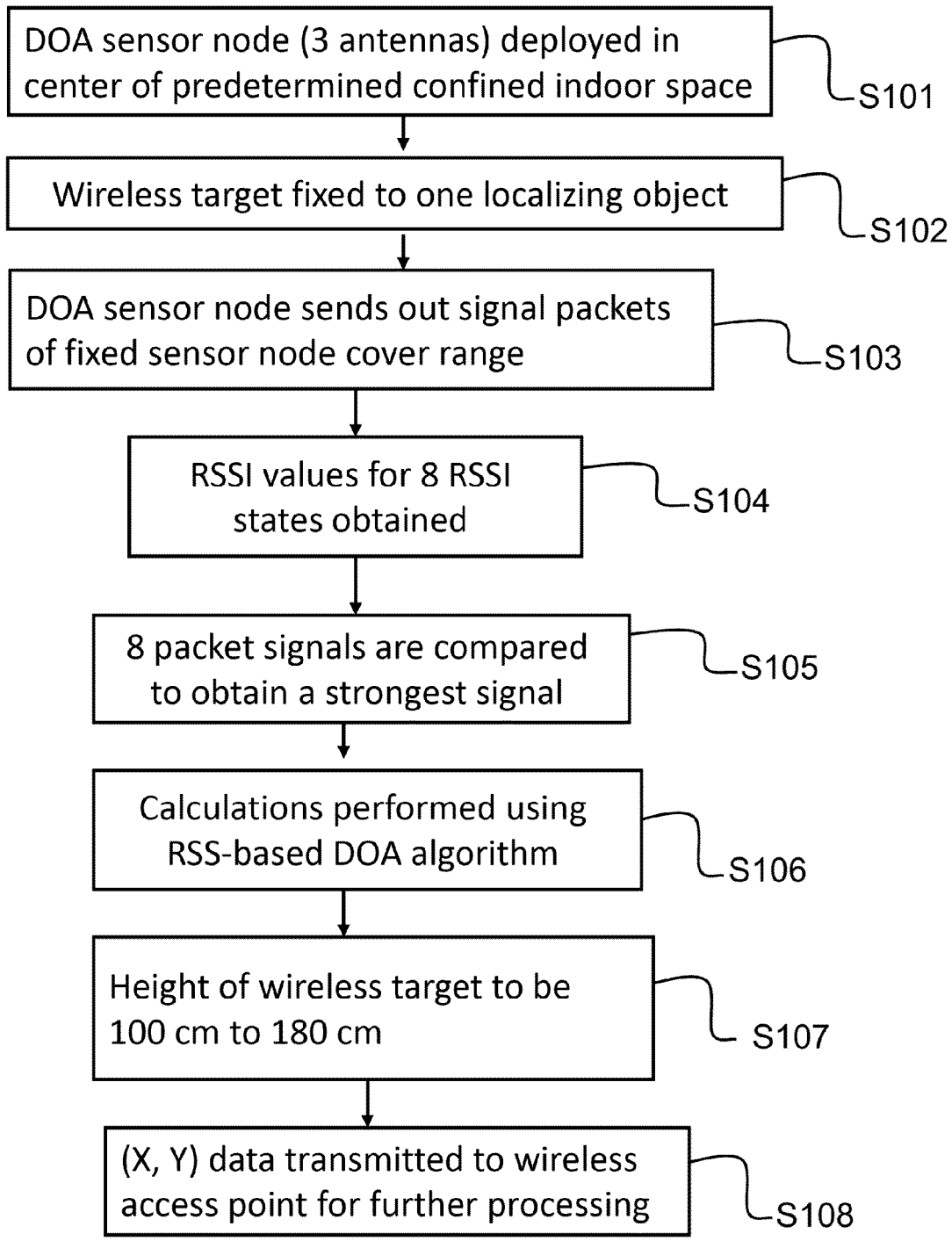
FIGS. 6a-6b show a method for providing positioning of one or more wireless electronic devices serving as wireless target in an indoor environment of a second embodiment.
Figure 6B:
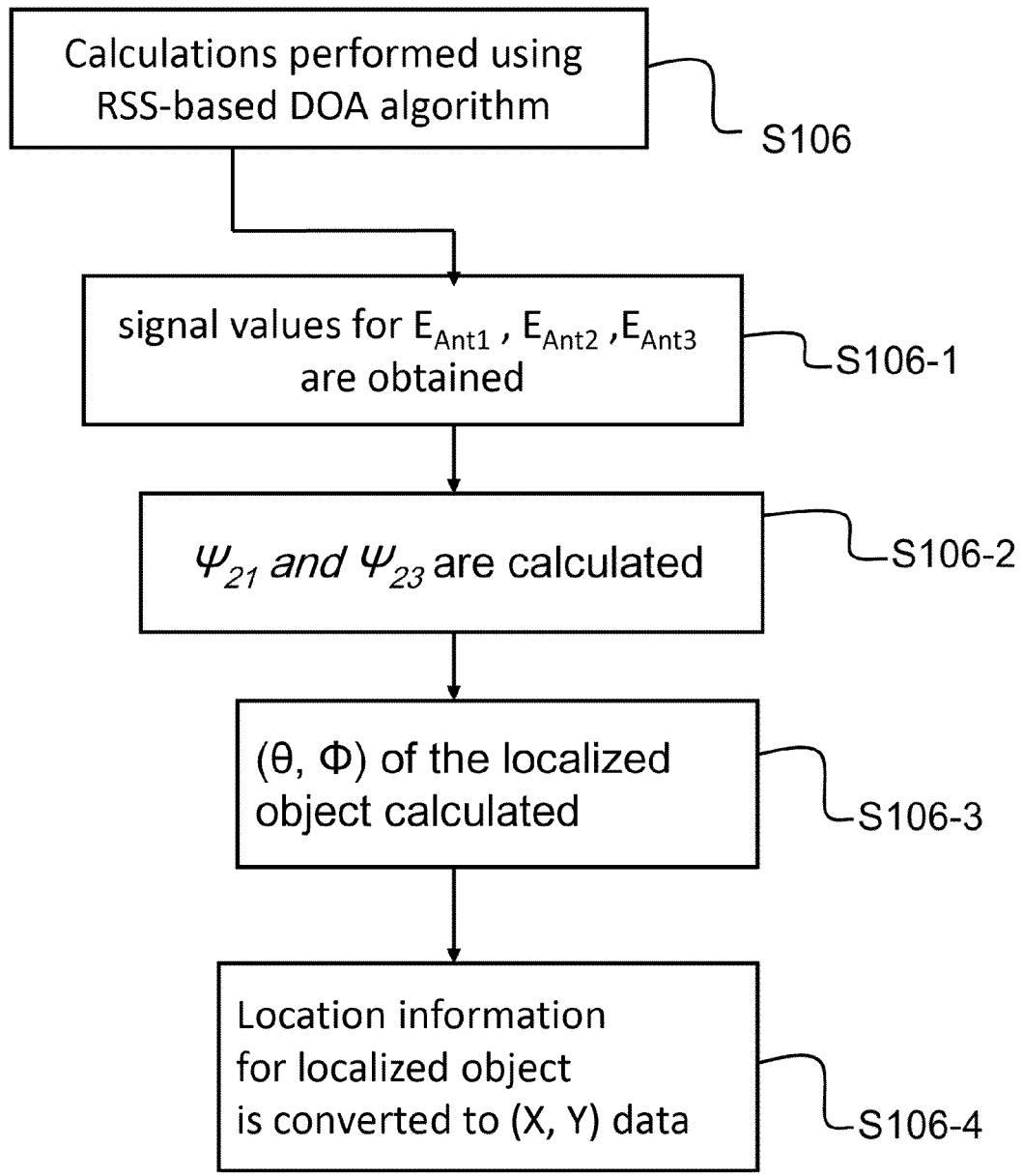

Referring to FIGS. 6*a* and 6*b*, a second embodiment of present invention is directed to a method for providing positioning of one or more wireless electronic devices serving as wireless target in an indoor environment described as follow:
One DOA sensor node comprising three antennas forming a triangular antenna array, namely, an antenna A, an antenna B, and an antenna C, is provided and deployed substantially in the center of a predetermined confined indoor space (S 101); It is worthy to point out that because typically a major problem in receiving RF signals in an indoor environment is the strong reflections components from walls, floor and ceiling. The reflection component received in the antennas A and B adds a signal component that may result in a deviation of the calculated direction. In order to cope with the error introduced by the reflection, the method of the second embodiment makes use of an antenna C. By measuring and calculating the phase differences between antenna pairs A-C and B-C, it is then possible to provide a total of three equations for calculating the direction of the transmitter. If all three measurements (obtained by antenna pairs A-B, A-C and B-C) provide the same direction, it can be concluded that the result is not impacted by reflections. If the results are not identical, it is possible to average the three directions or calculate the direction based on the solution of electromagnetic (EM) equations based on the signal vectors V1, V2 and V3 received by antenna A, B and C.

One or more wireless target is fixed to one localizing object (S 102). The DOA sensor node sends out a set number of signal packets or beams, each signal packet comprising of a fixed sensor node cover range such as 45 degrees, and having for example, a total of 8 packets per full rotation sweep covering 360 degrees of the entire confined indoor space (S 103).

In this embodiment, using the triangular antenna array having the 3 antenna nodes, a 1P2T switch, and a vector signal deconstructor (VSD) (a N-path amplitude and phase solver), the RSSI values for the respective 8 RSSI states ($|E_1|^2$, $|E_2|^2$ ... $|E_8|^2$) are obtained (S 104). RSSI can be received from the wireless target by a beam at an incident angle φ, or alternatively, RSSI can be received from one of the antennas, A, B, or C, of the DOA sensor node by a beam at an incident angle φ.

The eight packet signals are collected and compared by the DOA sensor node to obtain a strongest packet signal having the maximum RSSI value (S105). A number of calculations are performed under a RSS-based DOA algorithm (RSS to DOA) (S 106). The calculation for the location (θ, φ) of the localized object using the RSS-based DOA algorithm comprising the following steps:

1) signal values for $E_{Ant1}$, $E_{Ant2}$, $E_{Ant3}$ are obtained, and three sets of equations [6a~6c] are calculated as follow (S106-1):

$$E_{Ant_1} = A_1 e^{j\psi_1} = \alpha e^{j\left(\frac{2\pi r}{\lambda}\sin\theta\sin\phi\right)} \quad [6a\sim 6c]$$

$$E_{Ant_2} = A_2 e^{j\psi_2} = \alpha e^{j\left(\frac{2\pi r}{\lambda}\sin\theta\cos(30°+\phi)\right)}$$

$$E_{Ant_3} = A_3 e^{j\psi_3} = \alpha e^{j\left(-\frac{2\pi r}{\lambda}\sin\theta\cos(30°-\phi)\right)}$$

where α is path loss for the signal transmission, and the location (θ, φ) of the localized object can be derived from $\psi_{21}$ and $\psi_{23}$ 2) $\psi_{21}$ and $\psi_{23}$ are calculated using the following equations [7~10, 11a~11b], wherein $\psi_{21}$ are obtained from RSSI Values $|E_1|^2$ to $|E_4|^2$, and $\psi_{23}$ are obtained from RSSI Values $|E_5|^2$ to $|E_8|^2$ (S106-2):

$$\psi_{21} = \text{Phase}(E_{Ant_2}) - \text{Phase}(E_{Ant_1}) \quad [7]$$

$$= -\text{Tan}^{-1}\left(\frac{|E_3|^2 - |E_4|^2}{|E_1|^2 - |E_2|^2}\right), \text{ and} \quad [8]$$

$$\psi_{23} = \text{Phase}(E_{Ant_2}) - \text{Phase}(E_{Ant_3}) \quad [9]$$

$$= -\text{Tan}^{-1}\left(\frac{|E_7|^2 - |E_8|^2}{|E_5|^2 - |E_6|^2}\right). \quad [10]$$

3) From the equations [12] and [13] for $\sin\theta\sin\phi$ and $\sin\theta\cos\phi$, shown below, two sets of equations for $\theta$, $\phi$ are derived as follow:

$$\sin\theta\sin\phi = \frac{\psi_{21} - \frac{1}{2}\psi_{23}}{-\frac{2\pi r}{\lambda}(\sin 30° + 1)} \quad [12]$$

$$\sin\theta\cos\phi = \frac{\psi_{23}}{\frac{4\pi r}{\lambda}\cos 30°} \quad [13]$$

4) The location ($\theta$, $\phi$) of the localized object and the wireless target using values for $\psi_{21}$ and $\psi_{23}$ and the above two sets of equations are calculated (S106-3), as reproduced below:

$$\theta = \sin^{-1}\sqrt{\frac{(\psi_{23} - 2\psi_{21})^2 + 3\psi_{23}^2}{9\left(\frac{2\pi r}{\lambda}\right)^2}} \quad [14]$$

$$\phi = \tan^{-1}\left(\frac{\psi_{23} - 2\psi_{21}}{\sqrt{3}\,\psi_{23}}\right) \quad [15]$$

5) Using the location ($\theta$, $\phi$) of the localized object from the equations in step 4 and a plurality of location data from a location map of the predetermined confined indoor space, the location information for the localized object in the predetermined confined indoor space is converted to (X, Y) data (S106-4).

In the above calculations for the first and second embodiments, the direction of the wireless target is determined by calculation of the incident angle $\phi$ based on measurement of phase difference $\psi_{12}$ between the phases of signals received by, for example, antenna 1 and antenna 2 of first embodiment or antenna A and antenna B of second embodiment. Since antennas A and B or antenna 1 and antenna 2 are very close to each other, respectively (exemplarily less than 5% relative to their distance from the transmitter), in the absence of reflections, the amplitude of the signal received in both antennas is equal. Incident angle $\phi$ can then be calculated from phase difference.

The algorithm and equations described above may be implemented by a software program, which receives as inputs the following parameters: (a) the direction to the wireless target as obtained by the DOA sensor node forming a triangular antenna array, (b) the signal strength of the signals used for determining the direction to the wireless target (RSSI values in units of dBm), (c) the structure of the building, and (d) history of location records per area unit having a respective "certainty level". The implementation of such an algorithm in code would be clear to one skilled in the art.

In the second embodiment, the 3-path VSD is utilized by switching the 1P2T switch to obtain the location (X, Y) of the wireless target from the ($\theta$,$\phi$) of the localized object by assuming the height of the wireless target to be between 100 cm to 180 cm above the floor level (S 107).

The location (X, Y) data of the wireless target is transmitted to the wireless access point unit for communication to a host computer for further processing (S 108).

Figure 7:
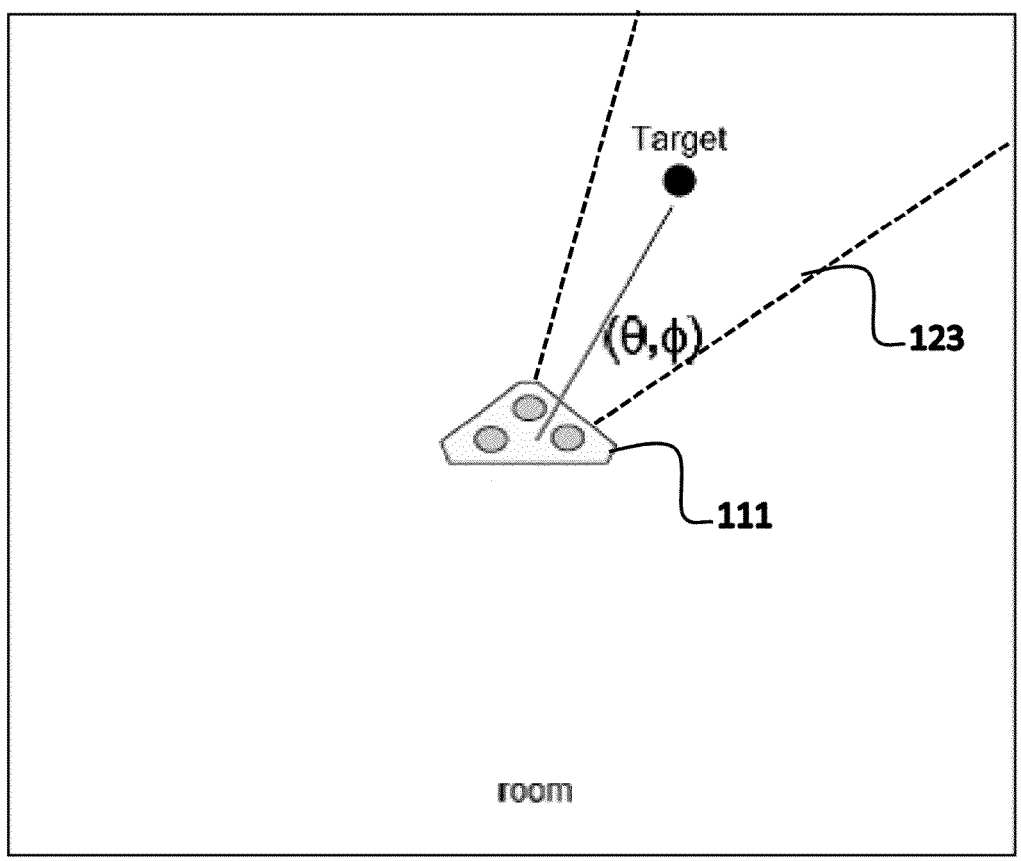
FIG. 7 shows a RSS to DOA localization system according to a third embodiment of the present invention.

A RSS to DOA localization system has been set up according to a third embodiment of the present invention. The RSS to DOA localization system 250 of the third embodiment is based on the received signal strength (RSS)-based direction-of-arrival (DOA) location estimation method (RSS to DOA) of the second embodiment of present invention, and includes only one DOA sensor node 111 deployed on the ceiling in the middle of a room inside the localization region, as shown in FIG. 7. The DOA sensor node 111 sends out a set number of signal packets, each signal packet comprising of a fixed sensor node cover range 123, and having for example, a total of 8 packets per full rotation sweep covering the 360 degrees of the entire room. The triangular antenna array of the DOA sensor node 111 is switched by using the 1P2T solid-state RF switch. Referring to FIGS. 8 and 9, in the present embodiment, the antennas, A, B, and C are arranged at the apexes of an equilateral triangle for forming the triangular antenna array. By doing so, 8 RSSI values are thereby obtained in units of dBm, such as $|E_1|^2$, $|E_2|^2$ ... $|E_8|^2$. Using the 3 antenna nodes via the 1P2T switch, the RSSI values for the respective 8 RSSI states ($|E_1|^2$ to $|E_8|^2$) are obtained, and the DOA sensor node 111 uses the RSS to DOA localization algorithm and the vector signal deconstructor (VSD) of first embodiment to calculate the location ($\theta$, $\phi$) of the localized object, which in turn, is then convert to (X, Y) of the localized object.

Figure 10:
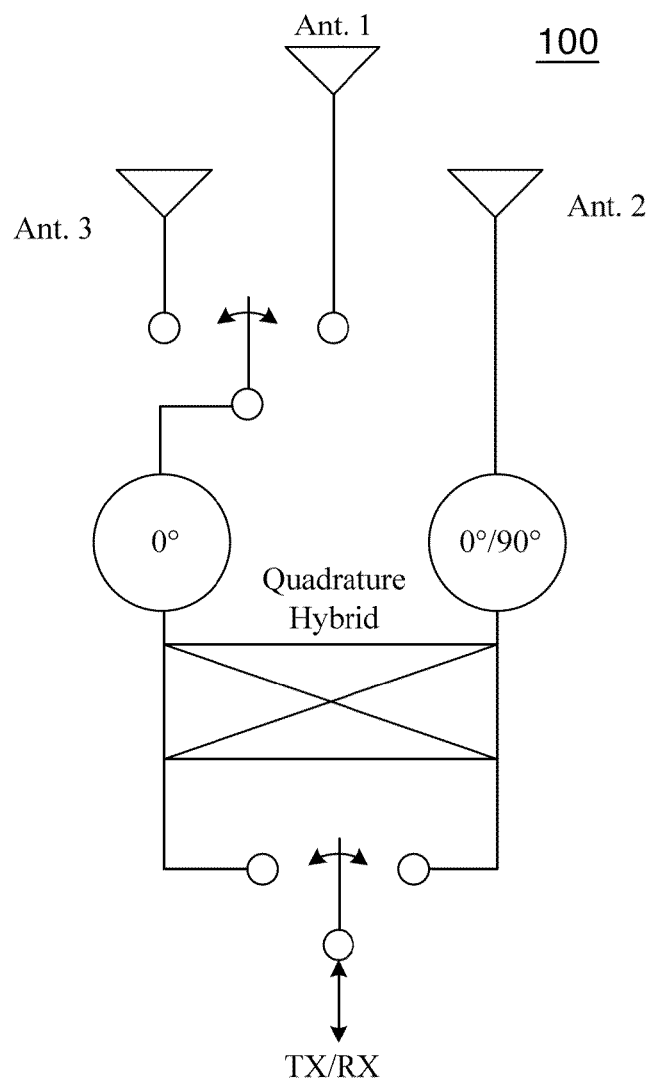
FIG. 10 shows a device configuration for the vector signal deconstructor (VSD) according to the second and third embodiments.
Figure 11:
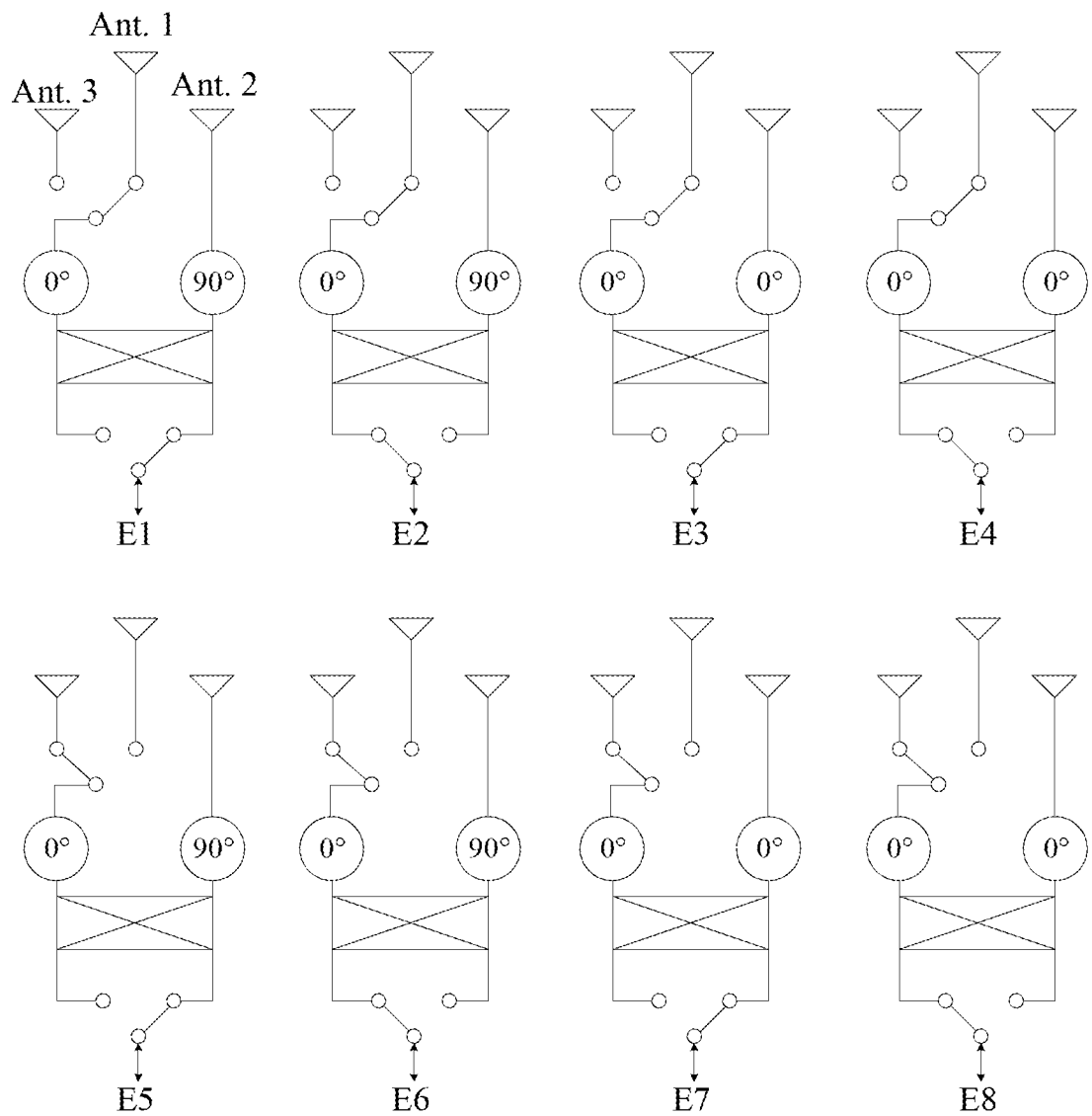
FIG. 11 shows eight vector-sum states as obtained via the vector signal deconstructor (VSD) are shown below in FIG. 10.

The device configuration for the vector signal deconstructor (VSD) 100 according to the second and third embodiments is shown in FIG. 10. The eight vector-sum states as obtained via the vector signal deconstructor (VSD) 100 are shown below in FIG. 11.

One DOA sensor node 111 is only able to obtain the $\theta$ and $\phi$ for an wireless target (and thus the location of the localized object), which means that the value for r is still missing for obtaining (X,Y,Z) data. However, because if the predetermined confined indoor space is relatively small, such as for example 5 m×5 m in size, and combined with the fact that the localized object such as a person may be holding a wireless target such as a mobile phone between the height around 100 cm to 180 cm above the floor of the confined indoor space. Therefore, the DOA sensor node 111 is configured at the center of the confined indoor space at (2.5 m, 2.5 m, 3 m) location. Room size for the predetermined confined indoor space is for example 5 m (L)×5 m (W)×3 m (H). The location of the DOA sensor node 111 comprising a set of three antennas is at (3 m, 3 m, 2.5 m) location. The testing height is for example, 1.4 m for the height of the wireless target above the floor. The multipath factor K=10 dB, for example. By performing the corresponding calculations, it is estimated that the error is around 65 cm, which should be an acceptable error within tolerance.

A Cumulative Distribution Function (CDF) or Cumulative Probability in percentages of the localization error is used to evaluate the performance of the RSS to DOA localization system of this embodiment.

Figure 12A:
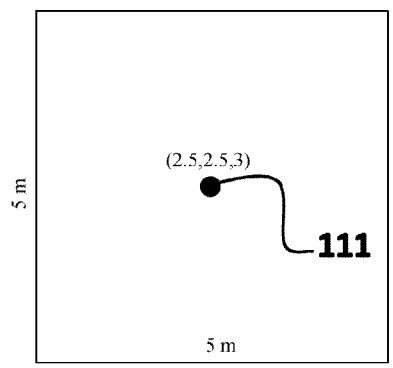
FIGS. 12a-12b show simulation configurations for the localization systems.
Figure 12B:
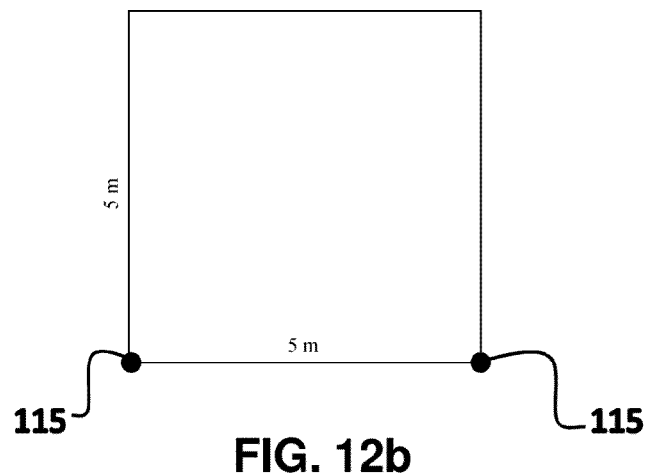
Figure 13:
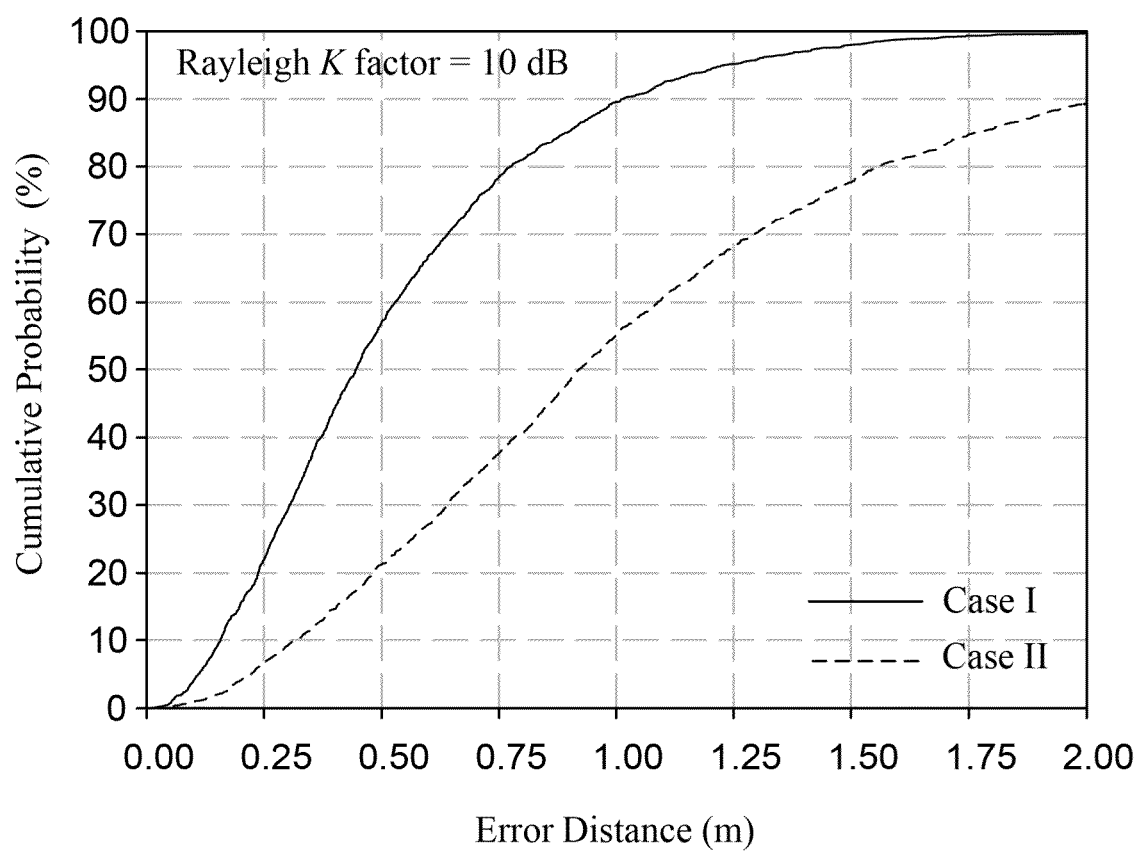
FIG. 13 shows the cumulative probability simulation results for case 1 of FIG. 12a and for case 2 of FIG. 12b.

A computer simulation study using the RSS-based DOA location estimation method of the second embodiment of present invention was conducted for a space of 5 m (L)×5 m (W)×3 m (H). As deducted by FIG. 12a, 12b, and Table 1 below, the percentiles as well as the mean accuracy are significantly improved in the case where the proposed RSS to DOA technique using a triangular antenna array and the VSD 100 of present embodiment is used, relative to the localization accuracy provided by the received signal strength-based algorithm alone. Referring to FIG. 12a (case 1), a DOA sensor node 111 is located at the ceiling of the center of a room, at location of (2.5 m, 2.5 m, 3 m). Referring to FIG. 12b (case 2), two conventional RSS sensor nodes 115 are located at the left bottom (0 m, 0 m, 1.4 m) and the right bottom (5 m, 0 m, 1.4 m) of the room, respectively. The height of the target is at 1.4 m and the position of the target is at (2.5 m, 2.5 m, 1.4 m). Number of samples: 300 points. Rayleigh K factor is 10 dB (experimental multipath condition in the indoor environment). Cumulative Probability Distribution is set with the following: the position of the target is (X, Y, 1.4 m), $0 \leq X \leq 5$ and $0 \leq Y \leq 5$ random samples; number of samples: 2000 points; Rayleigh K factor=10 dB. Referring to FIG. 12, the cumulative probability simulation results for case 1 of FIG. 12a and for case 2 of FIG. 12b above are presented in FIG. 13. The results from FIG. 13 is summarized in Table 1 below:

TABLE 1

| Cumulative Probability % | 25% | 50% | 75% | 90% |
| --- | --- | --- | --- | --- |
| Case 1 (Proposed) | 0.27 m | 0.44 m | 0.70 m | 1.01 m |
| Case 2 | 0.56 m | 0.92 m | 1.42 m | 2.04 m |

Referring to results from Table 1, the RSS-based DOA location estimation method of second embodiment of present invention (Case 1) show significant improvement over location estimation using two conventional RSS sensor nodes (Case 2).

In alternative embodiment, more than one DOA sensor nodes can be adapted together for providing the location of each wireless target and localized object pair.

Regarding issues concerning multipath interference as encountered in the embodiments of present invention, a Multipath Factor is defined as follow:

$$MP = \frac{|E_1|^2 + |E_2|^2 + \sqrt{4|E_1|^2|E_2|^2 - (|E_3|^2 - |E_4|^2)^2}}{|E_1|^2 + |E_2|^2 - \sqrt{4|E_1|^2|E_2|^2 - (|E_3|^2 - |E_4|^2)^2}} \geq 1 \quad [21]$$

and if $\sqrt{4|E_1|^2|E_2|^2 - (|E_3|^2 - |E_4|^2)^2}$ is equal to zero, then MP is equal to 1.

The information obtained from the received signal strength combined with the MP value obtained can assess whether any obstacles are present in the signal transmission path and to decide upon which one of the multiple number of DOA sensor node 111 is selected as the one used for determining positioning of the wireless target. The higher the MP value, the greater the obstruction by obstacles received, and the poorer the signal quality. Inversely, the lower the MP value, the better the signal quality for assessing positioning of the wireless target by the corresponding DOA sensor node 111 is achieved. By using the MP value and the received signal strength values as selection criteria, optimal DOA sensor node selection can be obtained for more effective indoor location determination of wireless targets and localized object.

It is noted that the scene analysis-based class of techniques is often considered to provide more accurate localization results compared to plain RSSI techniques, but with a high cost of in-situ measurements. On the other hand, because of the relatively simple structure and configuration of the received signal strength (RSS)-based direction-of-arrival (DOA) location estimation method and system of the embodiments of the present invention, the overall cost is lower than the more expensive plain scene analysis-based class comprising of multiple anchored reference nodes.

It is to be understood that even through numerous characteristics and advantages of the disclosure have been set forth in the foregoing description, together with details of the method, structure and function of the present disclosure, the present disclosure is for illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for received signal strength (RSS)-based direction-of-arrival (DOA) location estimation for one or more wireless target in an indoor environment, comprising:

providing and deploying a DOA sensor node, the DOA sensor node comprising three antennas, antennas A, B, and C, forming a triangular antenna array, configured substantially in a center of a predetermined confined indoor space;

fixing one or more wireless target to one or more localizing object;

sending out a plurality of packet signals by the DOA sensor node to the wireless target, each packet comprising of a fixed sensor node cover range, and a combined packet signals covering entire confined indoor space;

obtaining RSSI values for the respective RSSI states received from the wireless target by a plurality of beams at a plurality of incident angles θ and φ using the triangular antenna array, a Single-Pole-Double-Throw (1P2T) switch, and a vector signal deconstructor (VSD);

collecting and comparing eight packet signals by the DOA sensor node to obtain a strongest packet signal having a maximum RSSI value; and calculating a location (θ, φ) of the localized object using a RSS-based DOA algorithm on the data obtained from the strongest packet signal having the maximum RSSI value, the RSS-based DOA algorithm comprising of performing the following steps:

a) calculating θ, φ using values for $E_{Ant1}, E_{Ant2}, E_{Ant3}$ and three sets of equations as follow:

$$E_{Ant_1} = A_1 e^{j\psi_1} = \alpha e^{j(\frac{2\pi r}{\lambda} \sin\theta \sin\phi)}$$

$$E_{Ant_2} = A_2 e^{j\psi_2} = \alpha e^{j(\frac{2\pi r}{\lambda} \sin\theta \cos(30°+\phi))}$$

$$E_{Ant_3} = A_3 e^{j\psi_3} = \alpha e^{j(-\frac{2\pi r}{\lambda} \sin\theta \cos(30°-\phi))}$$

b) calculating a plurality of phase differences, $\psi_{21}$ and $\psi_{23}$, using the following two sets of equations, wherein $\psi_{21}$ is obtained from RSSI Values $|E_1|^2$ to $|E_4|^2$, and $\psi_{23}$ is obtained from RSSI Values $|E_5|^2$ to $|E_8|^2$ $$\psi_{21} = \text{Phase}(E_{Ant_2}) - \text{Phase}(E_{Ant_1})$$

$$= -\text{Tan}^{-1}\left(\frac{|E_3|^2 - |E_4|^2}{|E_1|^2 - |E_2|^2}\right), \text{ and}$$

-continued $$\psi_{23} = \text{Phase}(E_{Ant_2}) - \text{Phase}(E_{Ant_3})$$

$$= -\text{Tan}^{-1}\left(\frac{|E_7|^2 - |E_8|^2}{|E_5|^2 - |E_6|^2}\right)$$

c) calculating the location (θ, φ) of the localized object using values for $\psi_{21}$ and $\psi_{23}$ and the following two sets of equations:

$$\theta = \sin^{-1}\sqrt{\frac{(\psi_{23} - 2\psi_{21})^2 + 3\psi_{23}^2}{9\left(\frac{2\pi r}{\lambda}\right)^2}}$$

$$\phi = \tan^{-1}\left(\frac{\psi_{23} - 2\psi_{21}}{\sqrt{3}\,\psi_{23}}\right)$$

d) converting to (X, Y) of the localized object using the location (θ, φ) of the localized object and a plurality of location data from a location map of the predetermined confined indoor space.

2. The method for RSS-based DOA location estimation as claimed in claim 1, wherein the vector signal deconstructor generates a plurality of vector-sum states by combining the signals from each of the antennas, respectively.

3. The method for RSS-based DOA location estimation as claimed in claim 2, wherein four vector-sum states are the vector signal of a first antenna adding to the vector signal of a second antenna with 0°, 180°, 90°, 270° phase shifting, respectively, and only four vector-sum states are required for calculating the incident angle φ for each pair of antennas.

4. The method for RSS-based DOA location estimation as claimed in claim 2, wherein N-path vector signal deconstructor (VSD), in which N represents the total number of antennas utilized, thereby requiring a total of 4(N−1) vector-sum states for determining the phase differences and incident angle φ of the antennas.

5. The method for RSS-based DOA location estimation as claimed in claim 1, wherein a device configuration for the vector signal deconstructor (VSD) comprising a 0° reference line, a 0°/90° switchable phase shifter, a quadrature hybrid, and a 1P2T absorptive switch.

6. The method for RSS-based DOA location estimation as claimed in claim 1, wherein the RSS-based DOA algorithm is implemented by a software program, which receives the direction to the wireless target as obtained by the DOA sensor node forming a triangular antenna array, the signal strength of the signals used for determining the direction to the wireless target, the structure of the building, and history of location records per area unit having a respective certainty level as inputs.

7. The method for RSS-based DOA location estimation as claimed in claim 1, wherein respective distances of the antennas from each other are less than 5% relative to their distances from the transmitter, and the amplitude of the signal received in the antennas is thereby considered equal, and the incident angle φ is calculated directly from the phase difference.

8. The method for RSS-based DOA location estimation as claimed in claim 1, wherein the phase differences between antenna pairs A-C and B-C are measured and calculated, and if all three measurements obtained by antenna pairs A-B, A-C and B-C provide the same direction, then it is concluded that the result is not impacted by reflections; and if the measurement results are not identical, the three directions are averaged or the direction based on the solution of electromagnetic (EM) equations are calculated based on a plurality of signal vectors, V1, V2 and V3, received by the three antennas A, B and C.

9. The method for RSS-based DOA location estimation as claimed in claim 1, wherein only a plurality of received signal strength for received signal are required to calculate the phase difference and the signal strength.

10. The method for RSS-based DOA location estimation as claimed in claim 1, wherein a magnitude of the received signal by the first and second antennas are expressed in the following:

$$A_{1,2} = \frac{1}{2}\sqrt{|E_1|^2 + |E_2|^2 \pm \sqrt{4|E_1|^2|E_2|^2 - (|E_3|^2 - |E_4|^2)^2}}$$

wherein the value of the smaller signal =

$$\frac{1}{2}\sqrt{|E_1|^2 + |E_2|^2 - \sqrt{4|E_1|^2|E_2|^2 - (|E_3|^2 - |E_4|^2)^2}}$$

and value for the larger signal =

$$\frac{1}{2}\sqrt{|E_1|^2 + |E_2|^2 + \sqrt{4|E_1|^2|E_2|^2 - (|E_3|^2 - |E_4|^2)^2}}.$$

11. The method for RSS-based DOA location estimation as claimed in claim 1, wherein a Multipath Factor (MP) is defined for addressing multipath interference as follow:

$$MP = \frac{|E_1|^2 + |E_2|^2 + \sqrt{4|E_1|^2|E_2|^2 - (|E_3|^2 - |E_4|^2)^2}}{|E_1|^2 + |E_2|^2 - \sqrt{4|E_1|^2|E_2|^2 - (|E_3|^2 - |E_4|^2)^2}} \geq 1$$

and if $\sqrt{4|E_1|^2|E_2|^2 - (|E_3|^2 - |E_4|^2)^2}$ is equal to zero, then MP is equal to 1.

12. The method for RSS-based DOA location estimation as claimed in claim 11, wherein the multipath interference is evaluated by the VSD algorithm alone, and the signal strength is also used to assess multipath interference conditions.

13. The method for RSS-based DOA location estimation as claimed in claim 11, wherein the information obtained from the received signal strength combined with the MP value obtained are used to assess whether any obstacles are present in the signal transmission path and to decide upon which one of the multiple number of DOA sensor nodes is to be selected as the one for determining positioning of the wireless target.

14. A RSS to DOA localization system using the RSS-based DOA location estimation method of claim 1, comprising:
  one DOA sensor node;
  a triangular antenna array comprising of three antennas each of substantially the same size and configuration;
  a localization indoor region;
  one or more wireless target; and
  one or more localized object,
  wherein the DOA sensor node is deployed on the ceiling in the middle of the localization indoor region, and the antennas are arranged at the apexes of an equilateral triangle for forming the triangular antenna array.

15. The RSS to DOA localization system of claim 14, wherein the wireless target is a mobile phone, a smart phone, a tablet device, a digital camera with wireless communication capability, a PDA, a notebook computer, a computer with wireless capability, a USB wireless device, a game controller with wireless capability, or an object with a wireless identification tag, and the localized object is an object that is in close proximity or directly contacting the wireless target, which requires to obtain the location thereof or a person.

16. The RSS to DOA localization system of claim 14, wherein each of the DOA sensor node and the wireless target is to perform either as a transmitter or a receiver, respectively, and vice versa.

17. The RSS to DOA localization system of claim 14, wherein more than one DOA sensor nodes are adapted together for providing the location of each wireless target and localized object pair.

18. A method for providing positioning of one or more wireless electronic devices serving as wireless target in an indoor environment, comprising the steps of:
   providing one Direction of Arrival (DOA) sensor node comprising of three antennas forming a triangular antenna array, having a first antenna, a second antenna, and a third antenna, and deploying the DOA sensor node substantially in a center of a predetermined confined indoor space;
   attaching one or more wireless target to one localizing object;
   sending out a plurality of signal packets by the DOA sensor node, each signal packet comprising of a fixed sensor node cover range, and having eight packets per full rotation sweep covering 360 degrees of the entire confined indoor space;
   obtaining a plurality of RSSI values for the respective RSSI states using the triangular antenna array, a Single-Pole-Double-Throw (1P2T) switch, and a vector signal deconstructor (VSD);
   obtaining a strongest packet signal having a maximum RSSI value from the packet signals collected and compared by the DOA sensor node;
   performing calculations under a RSS-based DOA algorithm of claim 1 using data from the strongest packet signal having the maximum RSSI value, where a is path loss for the signal transmission, and the location $(\theta, \phi)$ of the localized object are derived from $\psi_{21}$ and $\psi_{23}$;
   converting the location information of the localized object in the predetermined confined indoor space to (X, Y) data using the location $(\theta, \phi)$ of the localized object;
   obtain the location (X, Y) of the wireless target from the $(\theta, \phi)$ of the localized object by assuming the height of the wireless target to be between 100 cm to 180 cm above the floor level; and
   transmitting the location (X, Y) data of the wireless target to the wireless access point unit for communication to a host computer for further processing.

19. The method for providing indoor positioning of the wireless electronic devices as claimed in claim 18, wherein the RSSI comprising signals received from the wireless target at an incident angle $\phi$ or signals received from the DOA sensor node at an incident angle $\phi$, and the RSSI signal transmission comprising a bidirectional characteristic.

20. The method for providing indoor positioning of the wireless electronic device as claimed in claim 19, wherein eight RSSI values are thereby obtained.

21. The method for providing indoor positioning of the wireless electronic device as claimed in claim 18, wherein a RSSI signal transmission by means of bidirectional characteristic is to perform under DoA RX mode or DoA TX mode.

* * * * *